No. 821,678. PATENTED MAY 29, 1906.
J. H. THEBERATH.
COLLAR SUPPORTER.
APPLICATION FILED JULY 28, 1905.
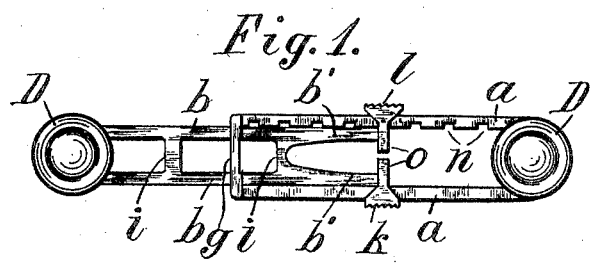
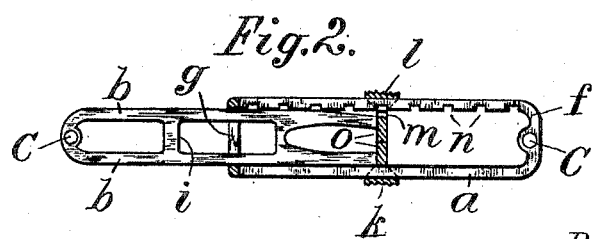
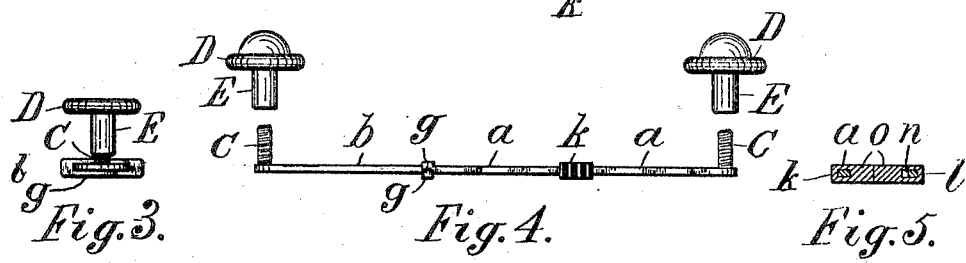
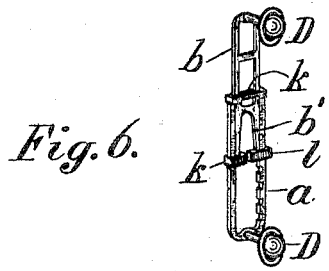
Attest:
L. Lee
Arthur F. Keaton
Inventor.
John H. Theberath,
per Thomas S. Crane, Atty.

UNITED STATES PATENT OFFICE.

JOHN HENRY THEBERATH, OF SOUTH ORANGE, NEW JERSEY, ASSIGNOR TO BIPPART, GRISCOM & OSBORN, OF NEWARK, NEW JERSEY, A FIRM.

COLLAR-SUPPORTER.

No. 821,678.      Specification of Letters Patent.      Patented May 29, 1906.

Application filed July 28, 1905. Serial No. 271,593.

*To all whom it may concern:*

Be it known that I, JOHN HENRY THEBERATH, a citizen of the United States, residing at 31 Ward Place, South Orange, Essex county, New Jersey, have invented certain new and useful Improvements in Collar-Supporters, fully described and represented in the following specification and the accompanying drawings, forming a part of the same.

The present invention relates to that class of collar-supporters which is used with lace collars and provided with two studs set transversely upon opposite ends of a bar and used by inserting the studs in the lace near opposite edges of the collar to hold the collar erect.

The object of the invention is to make the bar adjustable as to length; and the improvement consists in making the bar with two members adjustable one upon the other and a locking device to hold the members in their adjusted position.

The invention involves a telescopic construction, which may be varied in any manner provided the two members are furnished with a positive lock to hold them when adjusted.

In the example shown in the annexed drawings each of the members is made as a skeleton frame with parallel sides, one of the frames being adapted to slide within the other and having its inner end forked, so that the arms of the fork may be pressed one toward the other, one of the arms being provided with means for engaging the inner side of the outer frame to lock the two frames together when adjusted. The inner edge of the outer frame is shown formed with notches and one of the forked arms with a tooth to engage any of the notches, and the arms of the fork are provided with thumb-pieces which are mortised to embrace the edges of the outer frame.

In the drawings, Figure 1 is a plan of the complete supporter. Fig. 2 is a plan of the same in section at the upper sides of the frames. Fig. 3 is an end view, and Fig. 4 an edge view, with the studs removed and shown adjacent to their respective shanks. Fig. 5 is a cross-section through the parts $k$ $l$ in Fig. 4. These five figures are greatly enlarged to show the details of construction, and Fig. 6 is a perspective view of the collar-supporter drawn of the natural size. Fig. 6 shows the upper member of the telescopic construction arranged to slide within the lower one, each member having at its outer end a transverse screw-threaded shank C, upon which the stud D is held removably by means of a screw-threaded socket E, as is common in collar-supporters. The studs and shanks are termed "transverse" herein, as they stand at right angles to the plane of the whole device.

The upper member of Fig. 6 is shown (in the other figures) with two parallel side bars $a$, connected at one end with a cross-bar $f$, carrying the threaded shank C, and connected at the other end by ties $g$, between which and the bars $a$ the other member slides. The inner member is shown with side bars $b$, connected at one end by cross-bar $h$, carrying the threaded shank C, and connected by other tie-bars $i$, leaving the side bars forked at their inner ends, forming arms $b'$, which may be pressed elastically toward one another.

Each of the arms $b'$ is formed upon the end with a loop $k$ or $l$, which encircles one of the bars $a$, the loop $k$ being fitted merely to slide upon the bar $a$, while the loop $l$ clears the bar $a$ upon the outer side, so that when the loops are pressed together only one of them moves inwardly from the adjacent bar $a$. Such movable arm is shown at the upper sides of Figs. 1 and 2, and this arm is provided with a tooth $m$, adapted to engage any one of a series of notches $n$ formed upon the inside of the upper bar $a$.

The outer sides of the loops $k$ and $l$ are widened and roughened to increase the surface, so as to form thumb-pieces, and the two members may be slid one upon the other by pressing such thumb-pieces together and sliding one member within the other. When thus moved, the studs are instantly locked in their adjusted position by releasing the pressure upon the thumb-pieces and engaging the tooth $m$ with one of the notches. Lugs $o$ are shown upon the adjacent sides of the forked arms $b'$ to limit the inward compression.

The threaded sockets upon the studs permit them to be removed from the ends of the bar, if desired, which facilitates the application of the collar-supporter to lace having apertures too small to admit the passage of the studs. With lace having large apertures the studs are readily inserted therein.

The supporter is used by placing the bar vertically, as shown in Fig. 6, within the lace collar, inserting the shanks C through holes in the collar near its upper and lower edges if the lace has apertures too small to admit the studs, and then securing the studs upon the shanks.

The length of the bar may be adjusted before it is applied to the collar or after the studs are secured in place, such later adjustment permitting the lace to be stretched gently and the supporter operating thereafter to hold the collar erect.

Any number of such supporters may be applied to the collar, it being common to use one at each side of the neck.

Pearls or jewels D are shown upon the outer sides of the studs, which may be ornamented in any desired manner.

The removability of the studs from the shanks permits the jewels, if valuable, to be detached and packed for transportation without the extensible bar, and thus occupy much less room in the jewel-case.

It is immaterial whether the telescopic construction be made with cylindrical tubes, with flat tubes, or with the skeleton frames illustrated, although a flat construction is considered preferable, as it lies closer to the inner side of the lace. By fitting the skeleton frames one within the other the thickness of the whole structure is restricted to the thickness of a single frame, which thus avoids the additional thickness required if one member were embraced by the other.

The particular telescopic construction for an extensible bar which is shown in the drawings and having the locking device applied to the contiguous edges of the frames may be used for other purposes besides the collar-supporter, and I do not, herefore, limit myself to its use for that purpose.

In the use of two skeleton frames, one sliding within the other to avoid increasing the thickness of the extension-bar, it is immaterial whether the inner bar be forked to produce the locking device, as the essential feature of the inner member is the elastically-mounted tooth $n$ upon the inner member to engage the notches $m$ upon the inner side of the outer member.

The forked construction is a natural and preferable one, as the lower arm $b'$ of the fork lies exactly opposite the upper arm, and thus resists the pressure applied to the upper arm when the thumb-pieces are pressed together, and the ends of the arms furnish a convenient location for the stop which limits the inward movement of the tooth.

A single lug $o$ upon one of the forked arms would obviously form a stop if made of suitable length, and it will be obvious that the inner side of the loop which forms the movable thumb-piece $l$ serves also as a stop by contact with the outer side of the notch-bar $a$; but the inner stop is also desirable to prevent the outer bar from being bent by the pressure of the thumb, as the structure is in practice made of delicate proportions, and the parts are thus very slender.

It will be observed that a straight-line movement of the two members upon one another is secured by the engagement of the thumb-piece loops with the bars $a$ and the engagement of the ties $k$ with the bars $b$, the whole thus forming a flat telescopic device in which the two members are of the same thickness.

Having thus set forth the nature of the invention, what is claimed herein is—

1. An extensible collar-supporter having members formed of skeleton frames, the outer member having side bars $a$ with stud at one end, and at the other end the ties $g$, and having the notches $n$ within one of the side bars, and the inner member having side bars $b$ fitted to slide within the ties $g$ with transverse stud at the outer end, and a tooth carried by such inner member with means for engaging it detachably with the notches $n$ within the outer member.

2. The extension-bar having members formed of skeleton frames, the outer member having side bars $a$ connected at one end by ties $g$ and having the notches $n$ in one of said side bars, and the inner member having side bars $b$ fitted to slide within the side bars $a$ and having the fork at its inner end with arms $b'$ compressible toward one another, one of the arms having the tooth $m$ to engage the notches $n$, and the arms having thumb-pieces to press them together, whereby the members may be positively locked when adjusted.

3. An extensible collar-supporter having members formed of skeleton frames, the outer member having side bars $a$ with transverse stud at one end, and at the other end the ties $g$, and having the notches $n$ in one of the side bars, and the inner member having side bars $b$ fitted to slide within the ties $g$, with transverse stud at the outer end, and forked at the inner end with yielding arms $b'$, one of the arms having the tooth $m$ to engage the notches $n$ and the arms having a stop to limit inward movement, and thumb-pieces extended outside of the bars $a$, whereby the tooth can be disengaged from and reëngaged with the notches $n$ at pleasure.

In testimony whereof I have hereunto set my hand in the presence of two subscribing witnesses.

JOHN HENRY THEBERATH.

Witnesses:
ADRILL BIPPART,
THOMAS S. CRANE.